US012485346B2

(12) United States Patent
Osman

(10) Patent No.: US 12,485,346 B2
(45) Date of Patent: Dec. 2, 2025

(54) CAPTURING COMPUTER GAME OUTPUT MID-RENDER FOR 2D TO 3D CONVERSION, ACCESSIBILITY, AND OTHER EFFECTS

(71) Applicant: Sony Interactive Entertainment Inc., Tokyo (JP)

(72) Inventor: Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 415 days.

(21) Appl. No.: 18/054,008

(22) Filed: Nov. 9, 2022

(65) Prior Publication Data

US 2024/0149159 A1 May 9, 2024

(51) Int. Cl.
| A63F 13/00 | (2014.01) |
| A63F 13/52 | (2014.01) |
| G06T 11/00 | (2006.01) |
| G06T 19/20 | (2011.01) |

(52) U.S. Cl.
CPC ............ *A63F 13/52* (2014.09); *G06T 11/001* (2013.01); *G06T 19/20* (2013.01); *A63F 2300/66* (2013.01); *G06T 2210/32* (2013.01); *G06T 2219/2012* (2013.01)

(58) Field of Classification Search
None
See application file for complete search history.

(56) References Cited

U.S. PATENT DOCUMENTS

| 7,103,839 B1 * | 9/2006 | Natkin ................. G11B 27/034 |
| 7,889,205 B1 * | 2/2011 | Parenteau ............ G06T 11/001 345/592 |
| 10,589,171 B1 * | 3/2020 | Burke ..................... G06T 15/00 |
| 10,803,561 B2 * | 10/2020 | Ponto ................... G06T 15/005 |
| 10,818,029 B2 * | 10/2020 | Holzer ................. G06F 16/783 |
| 10,861,422 B1 * | 12/2020 | Seiler ...................... G09G 5/37 |
| 2011/0285743 A1 * | 11/2011 | Kilgard ................ G06T 15/005 345/592 |
| 2012/0176364 A1 * | 7/2012 | Schardt ................ G06T 15/005 345/419 |
| 2012/0293519 A1 * | 11/2012 | Ribble ..................... G06T 1/20 345/501 |
| 2013/0162651 A1 * | 6/2013 | Martin .................... G06T 17/20 345/441 |
| 2015/0264416 A1 * | 9/2015 | Heinz, II ......... H04N 21/23412 725/34 |

(Continued)

OTHER PUBLICATIONS

"International Search Report and Written Opinion", dated Mar. 1, 2024, from the counterpart PCT application PCT/US23/77693.

*Primary Examiner* — Paul A D'Agostino
(74) *Attorney, Agent, or Firm* — Fish & Richardson P.C.

(57) ABSTRACT

Important information with respect to image generation such as computer game video generation can be lost once the full image is composed. To avoid this, a customized capture script is created for a computer game to specify what to capture, for future use, in the middle of rendering a game video frame, such as frame buffer, depth buffer, stencil buffers, etc. The script also specifies when during frame rendering the data is to be recorded. By capturing data mid-frame, object boundaries on the screen and relative distances between objects can be inferred. This information can be used in 2D-to-3D conversion, object coloring for increased contrast, object highlighting, etc.

36 Claims, 5 Drawing Sheets

(56) References Cited

U.S. PATENT DOCUMENTS

| | | | |
|---|---|---|---|
| 2016/0191893 A1* | 6/2016 | Gewickey | H04N 13/344 |
| | | | 386/234 |
| 2016/0261841 A1* | 9/2016 | Mathew | H04N 13/344 |
| 2017/0024359 A1* | 1/2017 | Gagliano | G06F 40/197 |
| 2017/0243352 A1* | 8/2017 | Kutliroff | G06T 19/006 |
| 2018/0165789 A1* | 6/2018 | Gruber | G06T 11/001 |
| 2018/0174359 A1* | 6/2018 | Chen | G06T 15/005 |
| 2018/0286053 A1* | 10/2018 | Labbe | G06T 15/205 |
| 2018/0349108 A1 | 12/2018 | Brebner | |
| 2018/0357809 A1* | 12/2018 | Lawless | G06T 3/18 |
| 2019/0114830 A1* | 4/2019 | Bouazizi | G06F 3/013 |
| 2019/0141339 A1* | 5/2019 | Madajczak | G06T 15/005 |
| 2019/0206113 A1* | 7/2019 | Kipp | G06T 15/20 |
| 2019/0208007 A1* | 7/2019 | Khalid | H04L 67/1021 |
| 2019/0318509 A1* | 10/2019 | Budagavi | G06V 20/653 |
| 2019/0347757 A1* | 11/2019 | Selvik | G06T 1/20 |
| 2020/0243033 A1* | 7/2020 | Slavenburg | G09G 3/3674 |
| 2020/0265585 A1* | 8/2020 | Tasdizen | G06T 9/00 |
| 2020/0358187 A1* | 11/2020 | Tran | G10L 25/51 |
| 2020/0380700 A1* | 12/2020 | Holmes | G06T 3/20 |

* cited by examiner

CAPTURING COMPUTER GAME OUTPUT MID-RENDER FOR 2D TO 3D CONVERSION, ACCESSIBILITY, AND OTHER EFFECTS

FIELD

The present application relates generally to capturing computer game output mid-render for 2D to 3D conversion, accessibility, and other effects.

BACKGROUND

As understood herein, in rendering video frames for computer simulations such as computer games, multiple layers may be rendered in which some data buffers are re-used prior to completing composition of the full frame. For example, a color buffer may be used to render a layer of object shapes, a depth buffer may be used to render a layer representing depth in the frame, and then multiple other layers may be rendered including lighting layers, transparent layers, opaque layers, and so on by re-using the color and depth buffers.

SUMMARY

As further understood herein, should an operating system for example not have access to a computer game running in the O.S. apart from commands the game issues to a graphics processing unit (GPU) to render frames of video, information that may be valuable to the O.S. for purposes discussed herein can be lost, owing to the re-use of buffers for rendering multiple frame layers.

Accordingly, a device includes at least one computer storage that is not a transitory signal and that in turn incudes instructions executable by at least one processor to compose a first video frame of a computer simulation at least in part by rendering a first video layer using a first data buffer, rendering a second video layer using the first data buffer, and before completing composition of the first video frame, capture data in the first data buffer mid-rendering. The instructions are executable to alter an appearance of at least one object associated with the computer simulation using the data captured from the first data buffer.

In example embodiments the object is rendered in two dimensions (2D), the first data buffer includes a depth data buffer, and the instructions are executable to alter the appearance of the object at least in part by, in at least one frame following the first frame and/or in the first frame, rendering the object in 3D.

In other examples the object is rendered in two dimensions (2D), the first data buffer includes a depth data buffer, and the instructions are executable to alter the appearance of the object at least in part by, in at least one frame of a remastered version of the computer simulation, rendering the at least one object in 3D.

In some implementations the object is rendered in a first color in the first frame, the first data buffer includes a color data buffer, and the instructions are executable to alter the appearance of the object at least in part by, in at least one frame following the first frame and/or in the first frame, presenting the object in a second color different from the first color.

In other implementations the object is rendered in a first color in the first frame, the first data buffer includes a color data buffer, and the instructions are executable to alter the appearance of the object at least in part by, in at least one frame of a remastered version of the computer simulation, presenting the object in a second color different from the first color.

In example embodiments the instructions are executable to alter the appearance of the object at least in part by, in at least one frame following the first frame, highlighting the object. Note that in addition or alternatively the first frame itself may be modified before display and altered/remastered.

In other example embodiments the instructions are executable to alter the appearance of the object at least in part by, in at least one frame of a remastered version of the computer simulation, highlighting the object.

If desired, a script can be used to identify the first frame, and/or the first data buffer, to use in capturing data.

In another aspect, an apparatus includes at least one processor programmed with instructions to render at least one frame of video of a computer simulation. The instructions are executable to, mid-render, record first data from at least one buffer used in the render of the frame such that the data is recorded prior to completing composition of the frame and prior to the first data being replaced by second data during composition of the frame.

In another aspect, a method includes copying video data representing a first video layer in plural video layers together establishing a single video frame of a computer simulation, the single frame comprising at least one object, and using the video data to alter an appearance of the at least one object in the video simulation.

The details of the present application, both as to its structure and operation, can be best understood in reference to the accompanying drawings, in which like reference numerals refer to like parts, and in which:

DETAILED DESCRIPTION

Figure 1:
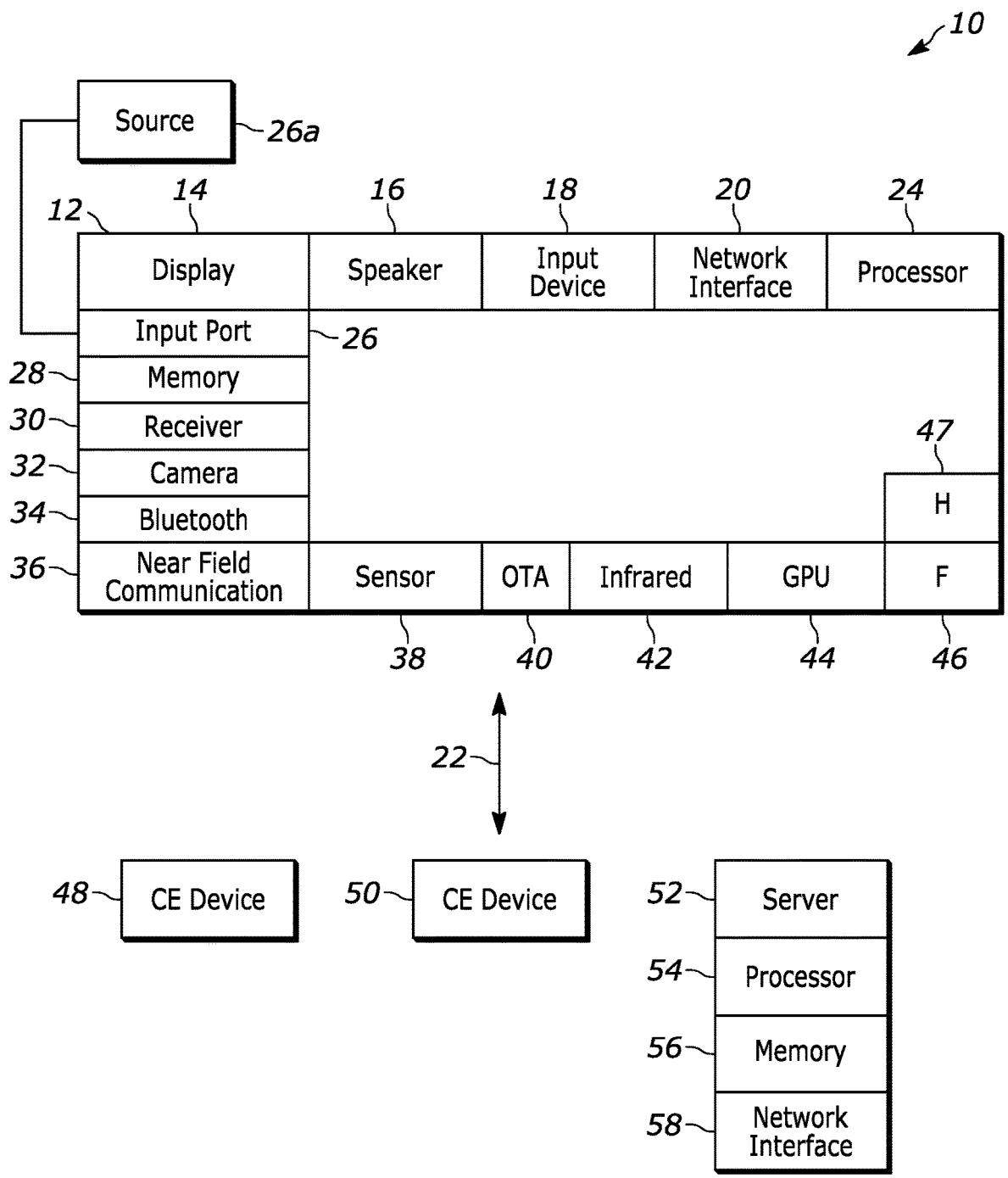
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony Play Station®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
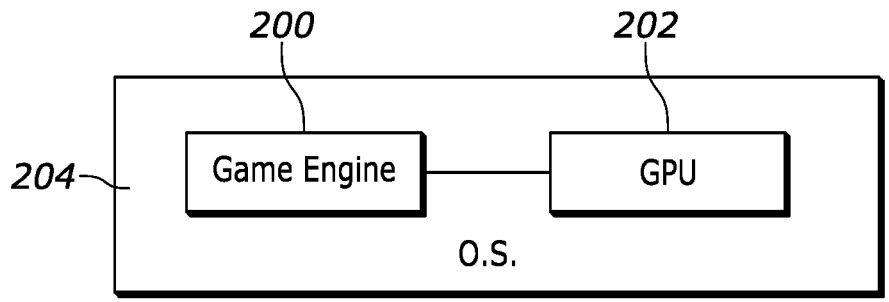
FIG. 2 illustrates a simplified architecture.

Refer now to FIG. 2. A computer simulation engine such as a legacy computer game engine 200 issues commands to one or more GPUs 202 to render demanded simulation video, frame by frame. An operating system 204 on which the game engine runs can detect the commands as they are sent to the GPU, although the legacy game engine itself may not communicate its rendering scheme apart from the commands to the GPU to the O.S. 204. Accordingly, the O.S. 204 may access an information program such as a script that has been constructed with an understanding of the rendering scheme in mind, to inform the O.S. when and where to capture data mid-render of one or more frames. By "capture" is meant record or copy data representing frame elements that the author of the script may wish to use in augmenting one or more objects in the simulation to make them easier to see for some people or to enhance their appearance in other ways as described herein.

Figure 3:
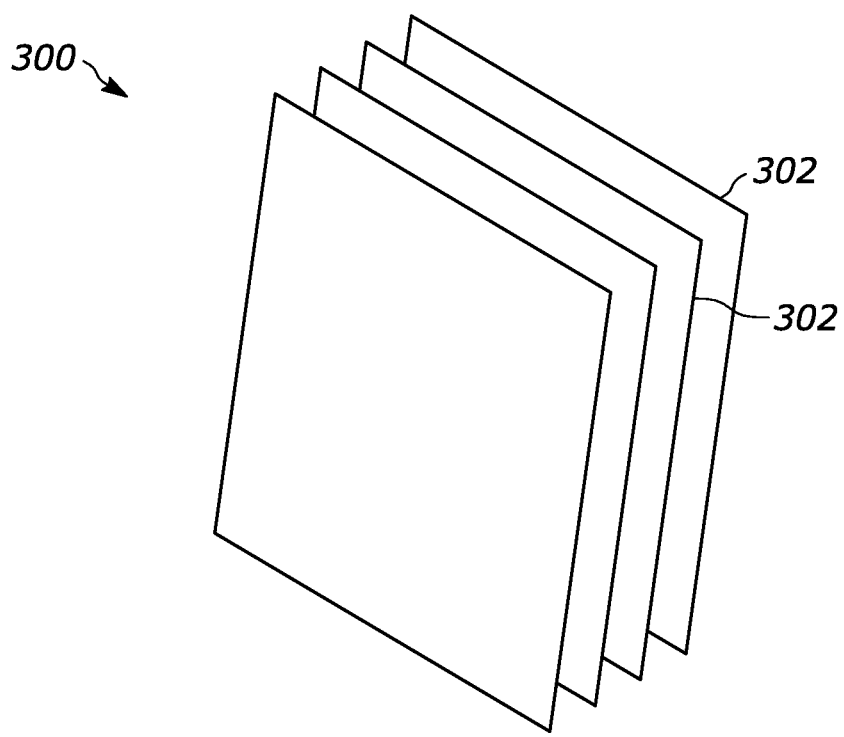
FIG. 3 schematically illustrates multiple layers of video data used to compose a single complete video frame.

FIG. 3 illustrates a single simulation video frame 300 that is rendered by sequentially rendered plural frame layers 302 (four frame layers shown for illustration only.) One frame layer may represent depth information, one might represent color information, one or more layers might represent lighting information, one or more layers may represent transparency information, one or more layers may be used for opaque geometry information (such as smoke), and so on.

Thus, in some cases information may be spread across several layers. For instance, some of the final composited frame may be made of parts from different layers. The script discussed elsewhere herein may explicitly specify that. Ultimately the script is trying to backtrack what is presented on the screen from where it came from.

Note further that parts of layers can be moved relative to each other, so that the script may specify that one particular layer is presented on one part of the screen and another layer is presented on another part of the screen. As an example, if heads-up display (HUD) elements are rendered separately in a small buffer, they may appear only on a corner of the screen.

As understood herein, in such layer-by-layer rendering, important information with respect to image generation can be lost by the time the full image frame 300 is completely composed. To avoid this, as discussed herein a customized capture script or other tool is created for a computer game to specify what to capture, for future use, in the middle of rendering a game video frame, such as data in a frame buffer, data in a depth buffer, data in a stencil buffer, etc. The script also specifies when during frame rendering the data is to be recorded. By capturing data mid-frame, object boundaries on the screen and relative distances between objects can be inferred. This information can be used in 2D-to-3D conversion, object coloring for increased contrast, object highlighting, etc.

A problem addressed herein is that in rendering a single frame with multiple layers, the same buffer can be used multiple times. For example, the color buffer may be used to render objects in color in one layer but then be flushed of data and re-used to render a lighting layer. If the color buffer is examined after frame composition, it is not always clear absent present principles what data is actually being examined. The same is true of the buffer nominally called the "depth" buffer, which, at frame composition completion, may not have data in it related to depth at all.

FIG. 3 essentially describes a specific example configured as a forward renderer. It is to be understood that present principles also apply to deferred rendering. In such an embodiment the various layers may contain "buffers" which have material information, depth, and other data.

Figure 4:
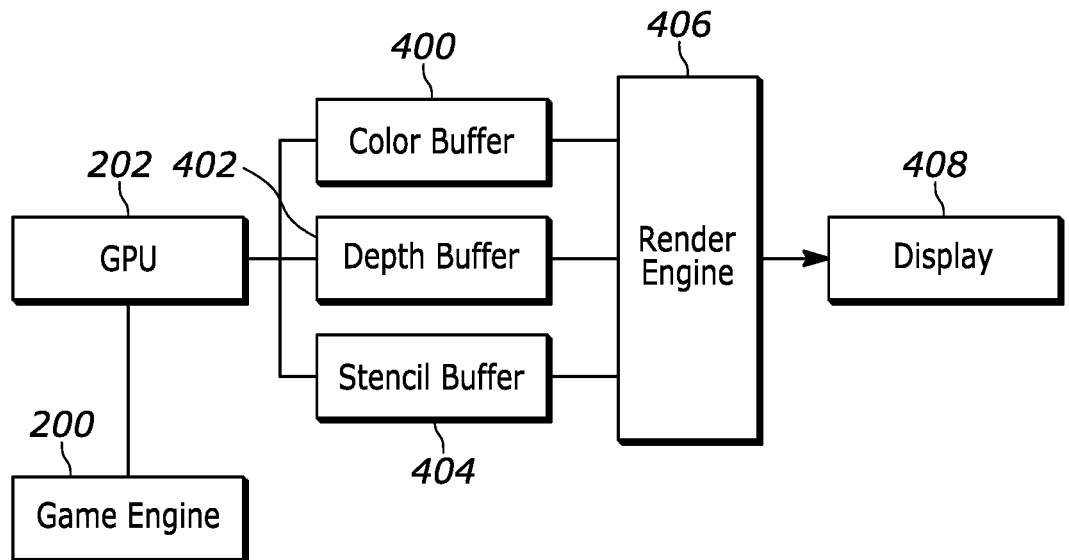
FIG. 4 illustrates an architecture with multiple data buffers for rendering video frames.

FIG. 4 illustrates additional detail. In rendering video, the GPU 202 may access data buffers including, by way of example, a color buffer 400, a depth buffer 402, and a stencil buffer 404. The data in the buffers is written out to a render engine 406 for presentation on a display 408 such as any display herein.

Figure 5:
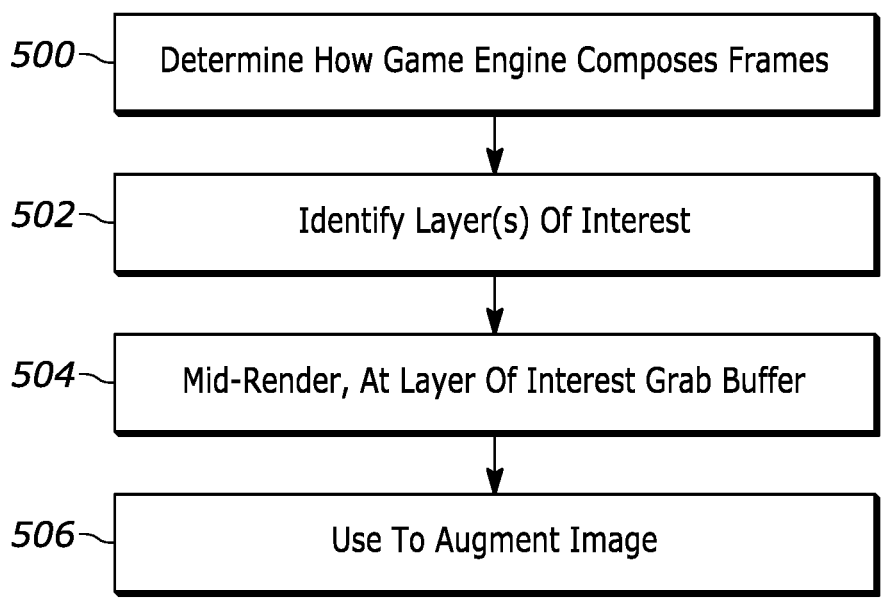
FIG. 5 illustrates example logic in example flow chart format consistent with present principles.

FIG. 5 illustrates example overall logic. Commencing at block 500, it is determined how a particular legacy game engine composes its frames in terms of what layers it uses for each frame and the buffers used for each layer. This determination may be done by accessing the software of the game or by observing in a laboratory setting game commands that are issued to the GPU and then identifying what the commands are.

Moving to block 502, it is determined which data in the frame rendering is of interest, e.g., depth data, or color data, or other data useful for the intended purpose of the designer. Once this information has been compiled and reflected in, e.g., a script or other format, it is provided to the O.S. 204 in FIG. 2 to enable the O.S. to, mid-rendering of one or more frames, capture the desired data from the appropriate buffer by a "buffer grab" (copying or recording the data in the buffer before the data is flushed for the next use of the buffer in rendering another layer of the frame).

Proceeding to block 506, the data captured in block 504 is used to augment an image by, e.g., changing the appearance of at least one object in the computer simulation. This may be for accessibility reasons by, for example, changing the color of an object to a different color more easily discerned by some people, or by highlighting the object to draw attention to it. Or, an object rendered in 2D by the legacy game may be rendered into 3D in a remastered version of the game. These changes may be made dynamically, i.e., for subsequent frames of the legacy game as it is presented, or offline in a remastered version of the game, and the changes typically are made not at the game level but at the O.S. level.

In another embodiment the highlighted version of the frame may be presented to spectators of the game or for replays of certain scenes in newly introduced "replay mode" or highlight reels. It could, for instance, highlight which enemy shot the player in a shootout, or highlight a football player who was about to sack the quarterback in a sports game.

Note that data in addition to that described above can be captured from memory as described by the script. Such additional data may be prepared by the CPU.

Figure 6:
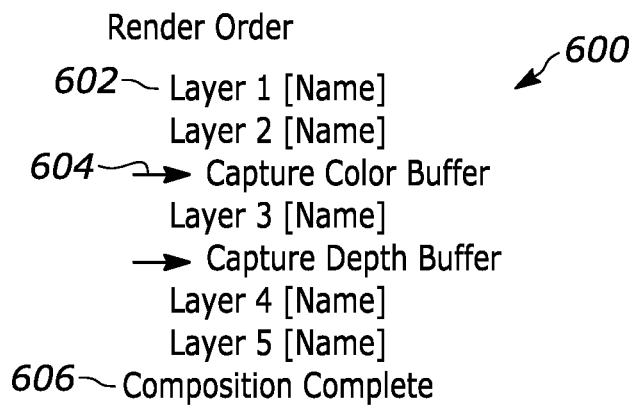
FIG. 6 illustrates an example buffer capture script consistent with present principles.

FIG. 6 illustrates an example script 600 that may receive, as input, commands from the game engine 200 in FIG. 2 to the GPU 202 (first, second, third draw calls as a trivial example). The script knows whether the current layer being drawn is an opaque layer, a depth layer, a color layer, a lighting layer, and so on and what buffer the data for the layer is in, so that desired data (such as color data or depth data) can be captured when the buffer the data is in is valid for the desired data.

Accordingly, the script 600 in the non-limiting example shown may include lines 602 each of which may correspond to a single layer of plural layers in a single frame. The name of the layer also may be included. A command 604 may appear for at least one of the layers to capture, prior to rendering the next layer, data from a specific buffer such as the color buffer or depth buffer. An indicator 606 may be provided after the last layer to indicate that the composition of the frame is complete once the last layer has been rendered.

During execution, the script 600 executed by the O.S. 204 in FIG. 2 may examine command codes being passed from the game engine 200 to the GPU 202 and determine whether the commands relate to an object and when such commands cease, ensuing commands relate to the next layer being drawn. This is advantageous because as understood herein, the number of layers used to compose a complete frame may change during the game, such as when a light is emulated to be destroyed and an associated lighting layer therefore is no longer drawn in rendering frames.

With further respect to the script, oblique frustum culling may be facilitated. Oblique frustum culling refers to a situation in which depth values may be accurate with respect to object separation, but may not necessarily correspond to an accurate depth for 3D reconstruction. The script can describe how to generate an accurate depth value from that.

To do this, a projection matrix may be modified. More generally, in some techniques, such as oblique frustum culling, depth values stored in the depth buffer are altered and the script provides methods to restore the depth values for 3D reconstruction.

Figure 7:
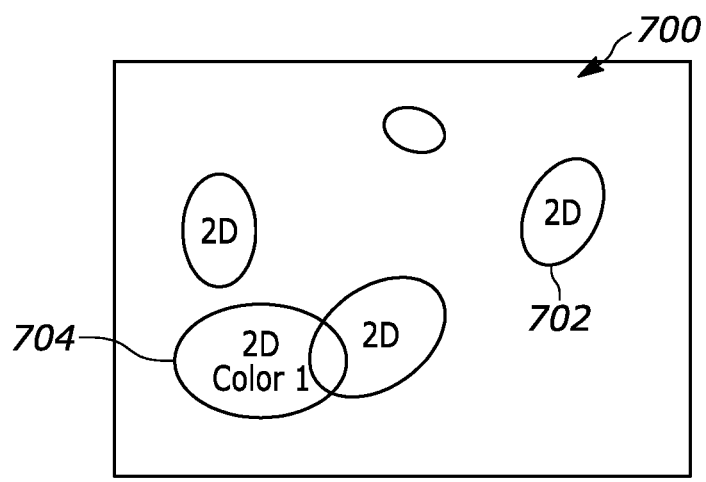
FIG. 7 illustrates a screen shot of a rendered frame from a legacy computer game.

FIG. 7 illustrates a screen shot 700 of a rendered frame from a legacy computer game that can be presented, for example, on any display discussed herein. All objects 702 in the non-limiting example shown are commanded for 2D presentation by the game engine 200. A foreground object 704 in particular may be presented in 2D and in a first color, and may overlap another object as shown.

Figure 8:
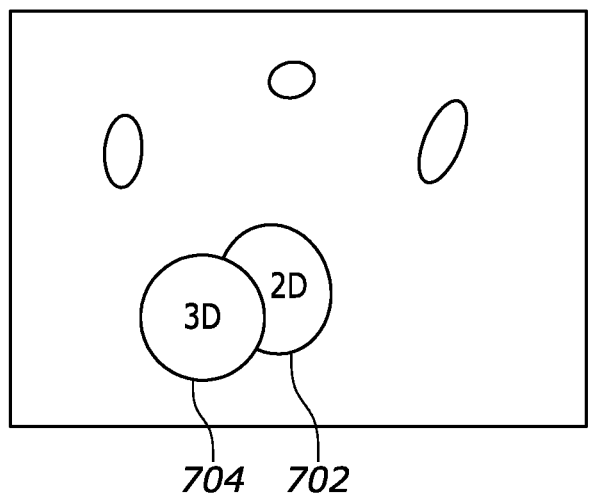
FIG. 8 illustrates a screen shot of a rendered frame that has been enhanced relative to FIG. 7 to present a foreground object in three-dimensional (3D) form using mid-render buffer capture.

Now consider FIG. 8, which illustrates a screen shot of a rendered frame that has been enhanced relative to FIG. 7 to present the foreground object 704 in three-dimensional (3D) form using mid-render buffer capture from the depth buffer, the data of which indicates that the foreground object 704 is in front of the other objects 702.

Figure 9:
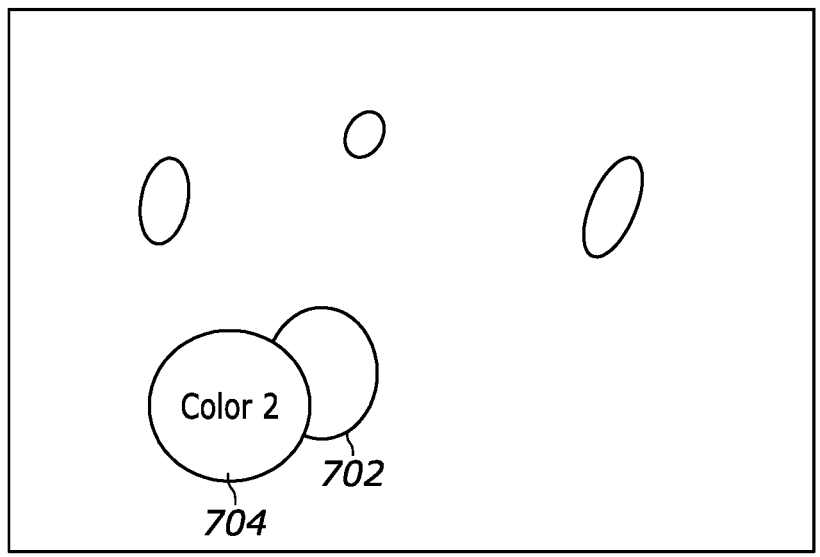
FIG. 9 illustrates a screen shot of a rendered frame that has been enhanced relative to FIG. 7 to present an object in a more-discernable color using mid-render buffer capture.

Further consider FIG. 9, which illustrates a screen shot of a rendered frame that has been enhanced relative to FIG. 7 to present an object (in the example shown, the foreground object 704) in a more-discernable color using mid-render buffer capture, in this case, by capturing the color buffer while it is still valid for color prior to being overwritten with data used to render subsequent layers of the frame.

Figure 10:
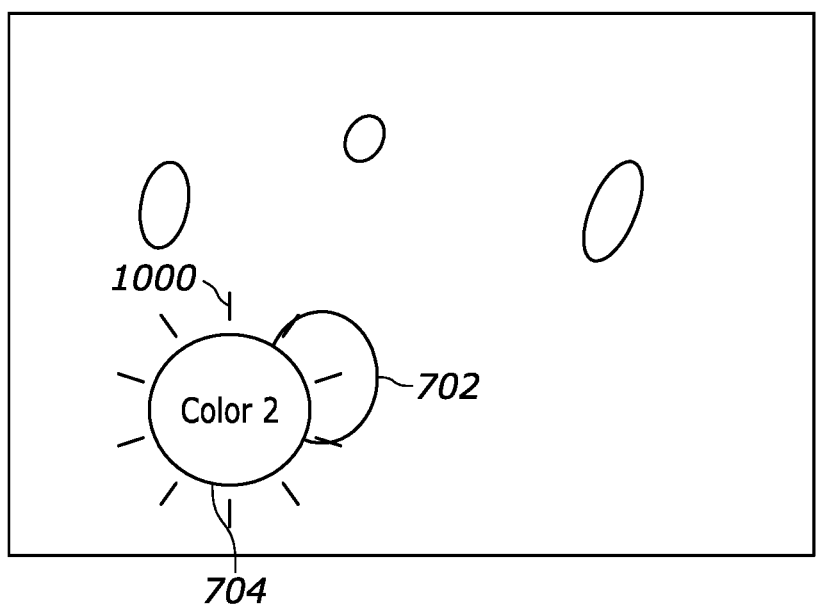
FIG. 10 illustrates a screen shot of a rendered frame that has been enhanced relative to FIG. 7 to highlight an object using mid-render buffer capture.

Yet again, FIG. 10 illustrates a screen shot of a rendered frame that has been enhanced relative to FIG. 7 to highlight, as indicated at 1000, an object (in the example shown, the foreground object 704) using mid-render buffer capture, in this case, by capturing the color buffer while it is still valid for color prior to being overwritten with data used to render subsequent layers of the frame.

While the particular embodiments are herein shown and described in detail, it is to be understood that the subject matter which is encompassed by the present invention is limited only by the claims.

What is claimed is:

1. A device comprising:
   at least one non-transitory computer-readable medium comprising instructions executable by at least one processor to perform operations comprising:
      selecting, for modification, a first video layer of a video frame of a computer simulation;
      determining that data for the first video layer was written to a data buffer, the data buffer comprising a depth data buffer;
      rendering at least a portion of the video frame using the data for the first video layer that was written to the data buffer, including rendering at least one object in two dimensions (2D);
      recording, from the data buffer, the data for the first video layer prior to the data for the first video layer being overwritten with data for a second video layer of the video frame; and
      modifying the data for the first video layer that was recorded from the data buffer to alter an appearance of the at least one object presented in the computer simulation, including, in at least one frame following the video frame and/or in the video frame, rendering the at least one object in three dimensions (3D).

2. The device of claim 1, wherein the at least one object is rendered in a first color in the video frame, and the operations comprise altering the appearance of the at least one object at least in part by:
   in the at least one frame following the video frame and/or in the video frame, presenting the at least one object in a second color different from the first color.

3. The device of claim 1, wherein the operations comprise altering the appearance of the at least one object at least in part by:
   in the at least one frame following the video frame and/or in the video frame, highlighting the at least one object.

4. The device of claim 1, wherein the operations comprise:
   using a script to identify at least one of: the video frame, and the data buffer, to use in recording data.

5. The device of claim 1, wherein the operations comprise:
   using a script to identify both of the video frame, and the data buffer, to use in recording data.

6. An apparatus comprising:
   at least one processor programmed with instructions to perform operations comprising:
      selecting, for modification, a first video layer of a video frame of a computer simulation;
      determining that data for the first video layer was written to a data buffer, the data buffer comprising a depth data buffer;
      rendering at least a portion of the video frame using the data for the first video layer that was written to the data buffer, including rendering at least one object in two dimensions (2D);
      recording, from the data buffer, the data for the first video layer prior to the data for the first video layer being overwritten with data for a second video layer of the video frame; and
      modifying the data for the first video layer that was recorded from the data buffer to alter an appearance of the at least one object presented in the computer simulation, including, in at least one frame following the video frame and/or in the video frame, rendering the at least one object in three dimensions (3D).

7. The apparatus of claim 6, wherein the at least one object is rendered in a first color in the video frame, and the operations comprise altering the appearance of the at least one object at least in part by:
   in at least one frame following the video frame and/or in the video frame, presenting the at least one object in a second color different from the first color.

8. The apparatus of claim 6, wherein the operations comprise altering the appearance of the at least one object at least in part by:
   in the at least one frame following the video frame and/or in the video frame, highlighting the at least one object.

9. A method, comprising:
   selecting, for modification, a first video layer of a video frame of a computer simulation;
   determining that data for the first video layer was written to a data buffer, the data buffer comprising a depth data buffer;

rendering at least a portion of the video frame using the data for the first video layer that was written to the data buffer, including rendering at least one object in two dimensions (2D);

recording, from the data buffer, the data for the first video layer prior to the data for the first video layer being overwritten with data for a second video layer of the video frame; and modifying the data for the first video layer that was recorded from the data buffer to alter an appearance of the at least one object presented in the computer simulation, including, in at least one frame following the video frame and/or in the video frame, rendering the at least one object in three dimensions (3D).

10. The method of claim 9, wherein recording the data for the first video layer comprises copying the data for the first video layer from the data buffer.

11. The device of claim 1, the operations comprising recording the data for the first video layer prior to rendering the at least the portion of the video frame using the data for the first video layer.

12. The method of claim 9, wherein the at least one object is rendered in a first color in the video frame, the method comprising altering the appearance of the at least one object at least in part by:
in the at least one frame following the video frame and/or in the video frame, presenting the at least one object in a second color different from the first color.

13. The method of claim 9, comprising altering the appearance of the at least one object at least in part by:
in the at least one frame following the video frame and/or in the video frame, highlighting the at least one object.

14. The method of claim 9, comprising:
using a script to identify at least one of: the video frame, and the data buffer, to use in recording data.

15. The method of claim 9, comprising:
using a script to identify both of the video frame, and the data buffer, to use in recording data.

16. The apparatus of claim 6, wherein the operations comprise:
using a script to identify at least one of: the video frame, and the data buffer, to use in recording data.

17. The apparatus of claim 6, wherein the operations comprise:
using a script to identify both of the video frame, and the data buffer, to use in recording data.

18. The apparatus of claim 6, wherein the operations comprise:
recording the data for the first video layer prior to rendering the at least the portion of the video frame using the data for the first video layer.

19. A device comprising:
at least one non-transitory computer-readable medium comprising instructions executable by at least one processor to perform operations comprising:
selecting, for modification, a first video layer of a video frame of a computer simulation;
determining that data for the first video layer was written to a data buffer, the data buffer comprising a depth data buffer;
rendering at least a portion of the video frame using the data for the first video layer that was written to the data buffer, including rendering at least one object in two dimensions (2D);
recording, from the data buffer, the data for the first video layer prior to the data for the first video layer being overwritten with data for a second video layer of the video frame; and
modifying the data for the first video layer that was recorded from the data buffer to alter an appearance of the at least one object presented in the computer simulation, including, in at least one frame of a remastered version of the computer simulation, rendering the at least one object in three dimensions (3D).

20. The device of claim 19, wherein the at least one object is rendered in a first color in the video frame, and the operations comprise altering the appearance of the at least one object at least in part by:
in the at least one frame of the remastered version of the computer simulation, presenting the at least one object in a second color different from the first color.

21. The device of claim 19, wherein the operations comprise altering the appearance of the at least one object at least in part by:
in the at least one frame of the remastered version of the computer simulation, highlighting the at least one object.

22. The device of claim 19, wherein the operations comprise:
using a script to identify at least one of: the video frame, and the data buffer, to use in recording data.

23. The device of claim 19, wherein the operations comprise:
using a script to identify both of the video frame, and the data buffer, to use in recording data.

24. The device of claim 19, wherein the operations comprise:
recording the data for the first video layer prior to rendering the at least the portion of the video frame using the data for the first video layer.

25. An apparatus comprising:
at least one processor programmed with instructions to perform operations comprising:
selecting, for modification, a first video layer of a video frame of a computer simulation;
determining that data for the first video layer was written to a data buffer, the data buffer comprising a depth data buffer;
rendering at least a portion of the video frame using the data for the first video layer that was written to the data buffer, including rendering at least one object in two dimensions (2D);
recording, from the data buffer, the data for the first video layer prior to the data for the first video layer being overwritten with data for a second video layer of the video frame; and
modifying the data for the first video layer that was recorded from the data buffer to alter an appearance of the at least one object presented in the computer simulation, including, in at least one frame of a remastered version of the computer simulation, rendering the at least one object in three dimensions (3D).

26. The apparatus of claim 25, wherein the at least one object is rendered in a first color in the video frame, and the operations comprise altering the appearance of the at least one object at least in part by:
in at least one frame of the remastered version of the computer simulation, presenting the at least one object in a second color different from the first color.

27. The apparatus of claim 25, wherein the operations comprise altering the appearance of the at least one object at least in part by:
    in the at least one frame of the remastered version of the computer simulation, highlighting the at least one object.

28. The apparatus of claim 25, wherein the operations comprise:
    using a script to identify at least one of: the video frame, and the data buffer, to use in recording data.

29. The apparatus of claim 25, wherein the operations comprise:
    using a script to identify both of the video frame, and the data buffer, to use in recording data.

30. The apparatus of claim 25, wherein the operations comprise:
    recording the data for the first video layer prior to rendering the at least the portion of the video frame using the data for the first video layer.

31. A method, comprising:
    selecting, for modification, a first video layer of a video frame of a computer simulation;
    determining that data for the first video layer was written to a data buffer, the data buffer comprising a depth data buffer;
    rendering at least a portion of the video frame using the data for the first video layer that was written to the data buffer, including rendering at least one object in two dimensions (2D);
    recording, from the data buffer, the data for the first video layer prior to the data for the first video layer being overwritten with data for a second video layer of the video frame; and
    modifying the data for the first video layer that was recorded from the data buffer to alter an appearance of the at least one object presented in the computer simulation, including, in at least one frame of a remastered version of the computer simulation, rendering the at least one object in three dimensions (3D).

32. The method of claim 31, wherein the at least one object is rendered in a first color in the video frame, the method comprising altering the appearance of the at least one object at least in part by:
    in at least one frame of the remastered version of the computer simulation, presenting the at least one object in a second color different from the first color.

33. The method of claim 31, comprising altering the appearance of the at least one object at least in part by:
    in the at least one frame of the remastered version of the computer simulation, highlighting the at least one object.

34. The method of claim 31, comprising:
    using a script to identify at least one of: the video frame, and the data buffer, to use in recording data.

35. The method of claim 31, comprising:
    using a script to identify both of the video frame, and the data buffer, to use in recording data.

36. The method of claim 31, comprising:
    recording the data for the first video layer prior to rendering the at least the portion of the video frame using the data for the first video layer.

\* \* \* \* \*